US011071065B2

(12) United States Patent
Sun et al.

(10) Patent No.: US 11,071,065 B2
(45) Date of Patent: Jul. 20, 2021

(54) UPLINK POWER CONTROL METHOD AND APPARATUS

(71) Applicant: HUAWEI TECHNOLOGIES CO., LTD., Guangdong (CN)

(72) Inventors: Wei Sun, Shenzhen (CN); Zhiheng Guo, Beijing (CN); Xinqian Xie, Beijing (CN); Yongqiang Fei, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 4 days.

(21) Appl. No.: 16/579,582

(22) Filed: Sep. 23, 2019

(65) Prior Publication Data
US 2020/0022088 A1    Jan. 16, 2020

Related U.S. Application Data

(63) Continuation of application No. PCT/CN2018/079438, filed on Mar. 19, 2018.

(30) Foreign Application Priority Data

Mar. 24, 2017    (CN) .......................... 201710184283.3

(51) Int. Cl.
*H04W 52/14* (2009.01)
*H04W 52/24* (2009.01)

(52) U.S. Cl.
CPC ....... *H04W 52/146* (2013.01); *H04W 52/242* (2013.01); *H04W 52/243* (2013.01)

(58) Field of Classification Search
CPC ............. H04W 52/146; H04W 52/143; H04W 52/241; H04W 72/0406; H04W 72/0426;
(Continued)

(56) References Cited

U.S. PATENT DOCUMENTS

2008/0081655 A1* 4/2008 Shin .................... H04W 52/246
455/522
2015/0110023 A1    4/2015 Pan et al.
(Continued)

FOREIGN PATENT DOCUMENTS

CN         103327594 A    9/2013
CN         103391168 A    11/2013
(Continued)

OTHER PUBLICATIONS

3GPP TSG RAN WG1 Meeting #88,R1-1701617,:'Channel sensing based scheme for cross-link interference mitigation in NR', ZTE, Athens, Greece, Feb. 13-1, 2017, total 10 pages.
(Continued)

*Primary Examiner* — Tu X Nguyen
(74) *Attorney, Agent, or Firm* — Womble Bond Dickinson (US) LLP

(57) ABSTRACT

This application provides embodiments of an uplink power control method and an apparatus, so that impact of interference between network devices on uplink signal transmission can be reduced, thereby helping increase a probability of successfully receiving an uplink signal by a network device. The method includes: determining, by a network device, an uplink power adjustment parameter value of a terminal device, where the uplink power adjustment parameter value is related to cross-link interference received by the network device; and sending, by the network device, information about the uplink power adjustment parameter value to the terminal device.

17 Claims, 4 Drawing Sheets

(58) Field of Classification Search
CPC ... H04W 52/243; H04W 48/12; H04W 52/10; H04W 52/12; H04W 52/34; H04W 52/38; H04B 1/7097
See application file for complete search history.

(56) References Cited

U.S. PATENT DOCUMENTS

| | | | | |
|---|---|---|---|---|
| 2015/0223178 | A1* | 8/2015 | Pietraski | H04W 16/08 370/252 |
| 2015/0333877 | A1 | 11/2015 | Rahman et al. | |

FOREIGN PATENT DOCUMENTS

| | | |
|---|---|---|
| CN | 103716890 A | 4/2014 |
| CN | 104349446 A | 2/2015 |
| CN | 104717733 A | 6/2015 |
| CN | 104780599 A | 7/2015 |
| CN | 105164948 A | 12/2015 |
| CN | 105228234 A | 1/2016 |
| EP | 2982062 B1 | 12/2019 |
| WO | 2005069504 A1 | 7/2005 |
| WO | 2014110783 A1 | 7/2014 |

OTHER PUBLICATIONS

ZTE et al: "Discussion on duplexing flexibility and cross-I ink interference mitigation schemes",3GPP Draft; R1-1701616, Feb. 12, 2017,total 8 pages.
Huawei et al: "Discussion on TRP-to-TRP interference mitigation schemes" ,3GPP Draft; R1-1608830, Oct. 1, 2016, total 4 pages.
Catt: "Interference management for dynamic TDD and flexible duplex",3GPP Draft; R1-1702113, Feb. 12, 2017,total 4 pages.

* cited by examiner

UPLINK POWER CONTROL METHOD AND APPARATUS

CROSS-REFERENCE TO RELATED APPLICATIONS

This application is a continuation of International Application No. PCT/CN2018/079438, filed on Mar. 19, 2018, which claims priority to Chinese Patent Application No. 201710184283.3, filed on Mar. 24, 2017. The disclosures of the aforementioned applications are hereby incorporated by reference in their entireties.

TECHNICAL FIELD

This application relates to the communications field, and more specifically, to an uplink power control method and an apparatus.

BACKGROUND

In a wireless communications system, duplex may be categorized into time division duplex (TDD) and frequency division duplex (FDD) by duplex mode. In the TDD mode, a communications system generally works at only one operating frequency band. The operating frequency band is used for only uplink communication or downlink communication within one time period. In the FDD mode, the communications system works at a pair of operating frequency bands. In the pair, one frequency band is used only for uplink communication, and the other frequency band is used only for downlink communication. Because terminal devices are unevenly distributed in a communications network, quantities of terminals may be different within coverage areas of different network devices. In addition, uplink and downlink service volumes of one terminal device may differ greatly from those of another terminal device within one time period, and therefore different network devices differ relatively greatly in uplink and downlink service volumes within one time period. However, in the existing TDD mode, different network devices need to use a same communications type at the operating frequency band within one time period; in the existing FDD mode, different network devices also need to use a same communications type at either of the paired operating frequency bands within one time period. Using a same communications type herein means that different network devices perform uplink communication or downlink communication simultaneously. Such a configuration method cannot meet an actual requirement on uplink and downlink service volumes of a terminal device within a coverage area of each network device. Therefore, a more flexible duplex technology is introduced to the prior art. To be specific, a communications type of each cell may be individually configured according to an actual service requirement. For example, for a TDD-mode communications network, uplink communication or downlink communication may be performed in every time period; for an FDD-mode communications network, downlink communication may be performed at an uplink frequency band within a specific time period. For ease of description, this duplex technology is referred to as a flexible duplex technology.

Considering that a transmit power of a network device is far greater than a transmit power of a terminal device, in a communications network using the flexible duplex technology, the following communications scenario is frequently encountered. To be specific, when a network device is performing uplink communication with a terminal device within a coverage area of the network device, one or more adjacent network devices are performing downlink communication with terminal devices within coverage areas of the adjacent network devices. It is easily figured out that, when the network device active in uplink communication receives an uplink signal, the network device receives strong interference caused by downlink signals sent by the adjacent network devices active in downlink communication. If two network devices use a same working frequency to receive an uplink signal and transmit a downlink signal respectively, transmission of the downlink signal causes stronger interference to reception of the uplink signal. Consequently, the network device is prone to unsuccessful reception of the uplink signal.

SUMMARY

This application provides embodiments of an uplink power control method and an apparatus, to help reduce impact of interference between network devices on uplink signal transmission, thereby helping increase a probability of successfully receiving an uplink signal by a network device.

According to a first aspect, this application provides an uplink power control method. The method includes: determining, by a network device, an uplink power adjustment parameter value of a terminal device, where the uplink power adjustment parameter value is related to cross-link interference received by the network device; and sending, by the network device, information about the uplink power adjustment parameter value to the terminal device.

In an embodiment of this application, the network device uses the cross-link interference received by the network device as a consideration factor to determine the uplink power adjustment parameter. The terminal device may determine an uplink power value based on the information about the uplink power adjustment parameter value, and sends an uplink signal to the network device based on the uplink power value. This helps reduce impact of interference between network devices on uplink signal transmission (for example, reduce impact made by a second network device on receiving the uplink signal by the network device), thereby helping increase the probability of successfully receiving the uplink signal by the network device.

In one embodiment, before the sending, by the network device, information about the uplink power adjustment parameter value to the terminal device, the method further includes: selecting, by the network device from a plurality of candidate uplink power adjustment parameter values based on the uplink power adjustment parameter value determined by the network device, a candidate uplink power adjustment parameter value with a minimum difference with the determined uplink power adjustment parameter value, where the information about the uplink power adjustment parameter value is used to indicate the candidate uplink power adjustment parameter value selected by the network device.

In this embodiment of this application, in comparison with that the network device directly sends the information used to indicate the uplink power adjustment parameter value, the network device sends the information used to indicate the candidate uplink power adjustment parameter value selected by the network device, the terminal device may determine the uplink power adjustment parameter value from the plurality of candidate uplink power adjustment parameter values based on the information about the uplink power adjustment parameter value. This helps reduce overheads for the network device to send the uplink power adjustment parameter information to the terminal device.

In one embodiment, the determining, by a network device, an uplink power adjustment parameter value of a terminal device includes: selecting, by the network device, one of the plurality of candidate uplink power adjustment parameter values as the uplink power adjustment parameter value.

In this embodiment of this application, this solution can reduce the overheads for the network device to send the uplink power adjustment parameter information to the terminal device.

In one embodiment, the plurality of candidate uplink power adjustment parameter values include candidate uplink power adjustment parameter values being 3, 4.8, 7, 9.5, 10, 10.5, 13, or 20.

In this embodiment of this application, some relatively frequently-used candidate uplink power adjustment parameter values may be set according to system simulation, actual measurement, or a system design requirement, to help the network device select a more accurate candidate uplink power adjustment parameter value, and correspondingly help the terminal device determine more accurate uplink power parameter information, thereby helping increase the probability of successful uplink signal transmission.

The method in this embodiment of this application can be applied to a flexible duplex technology, to reduce impact of the flexible duplex technology on receiving an uplink signal by the network device, thereby helping increase the probability of successfully receiving the uplink signal by the network device.

In one embodiment, the information about the uplink power adjustment parameter value is used to indicate the uplink power adjustment parameter value.

In one embodiment, the information about the uplink power adjustment parameter value is an identity of the selected uplink power adjustment parameter value.

In this embodiment of this application, the information about the uplink power adjustment parameter value is the identity of the selected uplink power adjustment parameter value information. This helps reduce a quantity of bits occupied by the information about the uplink power adjustment parameter value, thereby helping reduce overheads.

In one embodiment, the method may further include: obtaining, by the network device, the plurality of candidate uplink power adjustment parameter values; and sending, by the network device to the terminal device by using a radio resource control RRC message, information used to indicate the plurality of candidate uplink power adjustment parameter values.

In this embodiment of this application, the plurality of candidate uplink power adjustment parameter values may be configured by the network device for the terminal by using the RRC message. Further, this solution helps flexibly configure (or update) the plurality of candidate uplink power adjustment parameter values by the network device and the terminal device according to an actual case. This solution has relatively high flexibility and applicability.

In one embodiment, the determining, by a network device, an uplink power adjustment parameter value of a terminal device includes: determining, by the network device, the uplink power adjustment parameter value for sending an uplink signal by the terminal device at a first frequency band; or determining, by the network device, the uplink power adjustment parameter value of the terminal device for sending an uplink signal at a first frequency band. The first frequency band is full bandwidth or partial bandwidth.

In this embodiment of this application, the network device may determine a plurality of types of uplink power adjustment parameter values. Specifically, the uplink power adjustment parameter may be applicable to a terminal device served by the network device, and correspondingly, the terminal device may adjust an uplink power at the full bandwidth or the partial bandwidth based on the uplink power adjustment parameter value. The uplink power adjustment parameter may also be applicable to some terminal devices served by the network device (for example, terminal devices at the first frequency band). In other words, the network device may determine different uplink power adjustment parameters for different terminal devices. In this solution, the network device can determine a more accurate uplink power adjustment parameter value, to help the terminal device accurately adjust the uplink power, thereby helping increase the probability of successfully receiving the uplink signal by the network device.

In one embodiment, the determining, by a network device, an uplink power adjustment parameter value of a terminal device includes: determining, by the network device, the uplink power adjustment parameter value by receiving a first signal, where the first signal includes a downlink signal sent by the second network device.

In this embodiment of this application, the network device may determine the uplink power adjustment parameter value by receiving the first signal. This helps the network device determine the more accurate uplink power adjustment parameter value.

In one embodiment, the determining, by a network device, an uplink power adjustment parameter value of a terminal device includes: receiving, by the network device, the uplink power adjustment parameter value by receiving transmission information sent by the second network device, where the transmission information is used to indicate that the second network device and the network device have different communications types, or the transmission information is used by the network device to determine that the network device and the second network device have different communications types.

In this embodiment of this application, the transmission information may be used as a trigger condition, and when learning that the network device and the second network device have different communications types, the network device determines the uplink power adjustment parameter value, to help the network device efficiently determine the uplink power adjustment parameter value.

According to a second aspect, this application provides an uplink power control method. The method includes: receiving, by a terminal device, information about an uplink power adjustment parameter value from a network device; determining, by the terminal device, the uplink power adjustment parameter value based on the information about the uplink power adjustment parameter value, where the uplink power adjustment parameter value is related to cross-link interference received by the network device; and determining, by the terminal device, an uplink power value based on the uplink power adjustment parameter value.

In this embodiment of this application, the uplink power adjustment parameter value is related to the cross-link interference received by the network device. This helps reduce impact of interference between network devices on uplink signal transmission (for example, reduce impact made by a second network device on receiving an uplink signal by the network device), thereby helping increase a probability of successfully receiving the uplink signal by the network device.

In one embodiment, the terminal device stores a plurality of candidate uplink power adjustment parameter values, and the information about the uplink power adjustment parameter value is used to indicate a first candidate uplink power adjustment parameter value of the plurality of candidate uplink power adjustment parameter values. The determining, by the terminal device, the uplink power adjustment parameter value based on the information about the uplink power adjustment parameter value includes: determining, by the terminal device based on the information about the uplink power adjustment parameter value, the first candidate uplink power adjustment parameter value as the uplink power adjustment parameter value.

In this embodiment of this application, the terminal device may determine the uplink power adjustment parameter value from the plurality of candidate uplink power adjustment parameter values based on the information about the uplink power adjustment parameter value. This solution can reduce overheads for the network device to send the uplink power adjustment parameter information to the terminal device.

In one embodiment, the method may further include: receiving, by the terminal device, an RRC message sent by the network device, where the RRC message carries information used to indicate the plurality of candidate uplink power adjustment parameter values.

In this embodiment of this application, the plurality of candidate uplink power adjustment parameter values may be configured by the network device for the terminal by using the RRC message. Further, this solution helps flexibly update the plurality of candidate uplink power adjustment parameter values by the network device and the terminal device according to an actual case. This solution has relatively high flexibility and applicability.

In one embodiment, the plurality of candidate uplink power adjustment parameter values include candidate uplink power adjustment parameter values being −6, −3, 3, 4.8, 7, 9.5, 10, 10.5, 13, or 20.

In this embodiment of this application, some relatively frequently-used candidate uplink power adjustment parameter values may be set according to system simulation, actual measurement, or a system design requirement, to help the terminal device determine more accurate uplink power parameter information, thereby helping increase the probability of successful uplink signal transmission.

In one embodiment, the information about the uplink power adjustment parameter value is used to indicate a first value, and the terminal device determines the first value as the uplink power adjustment parameter value.

In one embodiment, the determining, by the terminal device, an uplink power value based on the uplink power adjustment parameter value includes: determining, by the terminal device, a first parameter value based on the uplink power adjustment parameter value, where the first parameter value makes the following formula true: $\gamma=10\log_{10}(1+\beta)$ or $\gamma=10\log_{10}(\beta)$, where $\gamma$ represents the first parameter value, and $\beta$ represents the uplink power adjustment parameter value; and determining, by the terminal device, the uplink power value based on the first parameter value.

In one embodiment, the uplink power adjustment parameter value is corresponding to $P_1$, and $P_1$ makes the following true: a signal-to-interference ratio SIR determined when a cross-link interference power value is 0 is equal to an SIR determined when the cross-link interference power value is not 0; or the uplink power adjustment parameter value is corresponding to $P_1$, and $P_1$ makes the following true: a signal to interference plus noise ratio SINR determined when a cross-link interference power value is 0 is equal to an SINR determined when the cross-link interference power value is not 0, where $P_1$ represents a variation amount of a receive power value of the network device, and the variation amount is corresponding to the uplink power adjustment parameter value.

In this embodiment of this application, the uplink power adjustment parameter value is corresponding to $P_1$, and $P_1$ helps keep the SIR or the SINR of the network device stable (or $P_1$ can avoid that the SIR or the SINR of the network device changes greatly). In other words, the uplink power adjustment parameter value can reduce impact of interference between network devices on the SIR or the SINR of the network device, thereby helping increase the probability of successfully receiving the uplink signal by the network device.

In one embodiment, that $P_1$ makes the following true: a signal-to-interference ratio SIR determined when a cross-link interference power value is 0 is equal to an SIR determined when the cross-link interference power value is not 0 includes that $P_1$ makes the following formula true: $P_0/I_1=(P_0+P_1)/(I_0+I_1)$ or $P_0/I_0=(P_0+P_1)/(I_{total})$, where $P_0$ represents a target receive power value of the network device when the cross-link interference power value is 0, $I_0$ represents a codirectional link interference power value of codirectional link interference received by the network device or a codirectional link interference power value stored in the network device, $I_1$ represents a cross-link interference power value of cross-link interference received by the network device, and $I_{total}$ represents a total interference power value of the cross-link interference and the codirectional link interference received by the network device.

In this embodiment of this application, the uplink power adjustment parameter value determined by the network device can make the foregoing formula true. The uplink power adjustment parameter value can reduce impact of interference between network devices on the SIR of the network device, thereby helping increase the probability of successfully receiving the uplink signal by the network device.

In one embodiment, the uplink power adjustment parameter value is $\beta$, and makes the following formula true: $\beta=10\log_{10}(1+I_1/I_0)$; $\beta=10\log_{10}(I_{total}/I_0)$; $\beta=I_1/I_0$; or $\beta=I_{total}/I_0$, where $I_0$ represents the codirectional link interference power value of the codirectional link interference received by the network device or the codirectional link interference power value stored in the network device, $I_1$ represents the cross-link interference power value of the cross-link interference received by the network device, and $I_{total}$ represents the total interference power value of the cross-link interference and the codirectional link interference received by the network device.

In this embodiment of this application, the network device may determine a plurality of types of uplink power adjustment parameter values. The solution has high flexibility and has relatively good compatibility and scalability.

In one embodiment, that $P_1$ makes the following true: a signal to interference plus noise ratio SINR determined when a cross-link interference power value is 0 is equal to an SINR determined when the cross-link interference power value is not 0 includes that $P_1$ makes the following formula true: $P_0/I_0=(P_0+P_1)/(I_0+I_1)$ or $P_0/I_0=(P_0+P_1)/(I_{total})$, where $P_0$ represents a target receive power value of the network device when the cross-link interference power value is 0, $I_0$ represents a codirectional link interference power value of codirectional link interference received by the network device or a codirectional link interference power value stored in the network device, $I_1$ represents a cross-link interference power value of cross-link interference received by the network device, $I_{total}$ represents a total interference power value of the cross-link interference and the codirectional link interference received by the network device, and N represents a noise power value of the network device.

In this embodiment of this application, the uplink power adjustment parameter value determined by the network device can make the foregoing formula true. The uplink power adjustment parameter value can reduce impact of interference between network devices on the SINR of the network device, thereby helping increase the probability of successfully receiving the uplink signal by the network device.

In one embodiment, the uplink power adjustment parameter value is β, and makes the following formula true: $\beta=10\log_{10}(1+I_1/(I_0+N))$; $\beta=10\log_{10}((I_{total}+N)/(I_0+N))$; $\beta=I_1/(I_0+N)$; or $\beta=(I_{total}+N)/(I_0+N)$, where $I_0$ represents the codirectional link interference power value of the codirectional link interference received by the network device or the codirectional link interference power value stored in the network device, $I_1$ represents the cross-link interference power value of the cross-link interference received by the network device, $I_{total}$ represents the total interference power value of the cross-link interference and the codirectional link interference received by the network device, and N represents the noise power value.

In this embodiment of this application, the network device may determine a plurality of types of uplink power adjustment parameter values. The solution has high flexibility and has relatively good compatibility and scalability.

In one embodiment, the uplink power adjustment parameter value or an uplink power value makes the following formula true: $P=\min\{P_{max}, F(M, P_0, \alpha)+\beta\}$; $P=\min\{P_{max}, F(M, P_0, \alpha)+10\log_{10}(1+\beta)\}$; or $P=\min\{P_{max}, F(M, P_0, \alpha)+10\log_{10}\beta\}$, where P represents the uplink power value of the terminal device, min{ } means to calculate a minimum value, $P_{max}$ represents a maximum uplink power value allowed by the terminal device, M represents a quantity of resource blocks used when the terminal device sends an uplink signal, $P_0$ represents the target receive power value of the network device when the cross-link interference power value is 0, α represents a path loss compensation parameter, β represents the uplink power adjustment parameter value, and $F(M, P_0, \alpha)$ represents a function related to M, $P_0$, and α.

In one embodiment, within one time period at one frequency band, the network device and a network device adjacent to the network device may have different communications types.

The method in this embodiment of this application can be applied to a flexible duplex technology, to reduce impact of the flexible duplex technology on receiving an uplink signal by the network device, thereby helping increase the probability of successfully receiving the uplink signal by the network device.

In one embodiment, the information about the uplink power adjustment parameter value is carried in downlink control information. The downlink control information is downlink control information dedicated to the terminal device or the downlink control information is downlink control information common to a plurality of terminal devices.

In this embodiment of this application, the information about the uplink power adjustment parameter value may be used for a specific terminal device to perform uplink power control, or may be used for a plurality of terminal devices to perform uplink power control. Different manners may be used according to actual cases, and this solution has high flexibility.

It should be understood that, in this embodiment of this application, the downlink control information may not include uplink scheduling information. In other words, the uplink scheduling information (Uplink, grant) and the information about the uplink power adjustment parameter value may be sent in different downlink control information at different time periods. The downlink control information may be downlink control information dedicated to the terminal device or downlink control information common to a group of terminal devices.

According to a third aspect, this application provides a network device, configured to perform the method in the first aspect or the possible implementations of the first aspect. Specifically, the network device includes units configured to perform the method in the first aspect or any possible implementation of the first aspect.

According to a fourth aspect, this application provides a terminal device, configured to perform the method in the second aspect or any possible implementation of the second aspect. Specifically, the terminal device includes units configured to implement the second aspect or any possible implementation of the second aspect.

According to a fifth aspect, this application provides a network device. The network device includes one or more processors, one or more memories, and one or more transceivers (each transceiver includes a transmitter and a receiver). The transmitter or the receiver is connected to one or more antennas, and transmit or receive a signal through an antenna. The memory is configured to store a computer program instruction (in other words, code). The processor is configured to execute the instruction stored in the memory. When the instruction is executed, the processor performs the method in the first aspect or any possible implementation of the first aspect.

According to a sixth aspect, this application provides a terminal device. The terminal device includes one or more processors, one or more memories, and one or more transceivers (each transceiver includes a transmitter and a receiver). The transmitter or the receiver is connected to one or more antennas, and transmit or receive a signal through an antenna. The memory is configured to store a computer program instruction (in other words, code). The processor is configured to execute the instruction stored in the memory. When the instruction is executed, the processor performs the method in the second aspect or any possible implementation of the second aspect.

According to a seventh aspect, this application provides a communications system, including a plurality of the network devices in the fifth aspect.

According to an eighth aspect, this application provides a computer-readable storage medium. The computer-readable storage medium stores an instruction. When the instruction runs on a computer, the computer is enabled to perform the method in the first aspect or any possible implementation of the first aspect.

According to a ninth aspect, this application provides a computer-readable storage medium. The computer-readable storage medium stores an instruction. When the instruction runs on a computer, the computer is enabled to perform the method in the second aspect or any possible implementation of the second aspect.

According to a tenth aspect, this application provides a system chip. The system chip includes an input/output interface, at least one processor, a memory, and a bus. The processor is configured to perform the method in the first aspect or any possible implementation of the first aspect.

According to an eleventh aspect, this application provides a system chip. The system chip includes an input/output interface, at least one processor, a memory, and a bus. The processor is configured to perform the method in the second aspect or any possible implementation of the second aspect.

In the embodiments of this application, the network device uses cross-link interference received by the network device as a consideration factor to determine the uplink power adjustment parameter value of the terminal device. The terminal device may determine the uplink power value based on the information about the uplink power adjustment parameter value, and sends an uplink signal to the network device based on the uplink power value. This solution helps reduce impact of interference between network devices on uplink signal transmission (for example, reduce impact made by the second network device on receiving the uplink signal by the network device), thereby helping increase the probability of successfully receiving the uplink signal by the network device.

DESCRIPTION OF EMBODIMENTS

The following describes technical solutions of this application with reference to accompanying drawings.

It should be understood that division of manners, cases, and types in embodiments of this application are merely for ease of description, and should not constitute any special limitation, and features in various manners, types, and cases may be combined with each other in case of no contradiction.

It should be further understood that "first", "second", and "third" in the embodiments of this application are merely used for differentiation, but should not constitute any limitation on this application.

For ease of understanding of the embodiments of this application, interference in a communications system is first described briefly.

The interference in the communications system includes codirectional link interference and cross-link interference.

1. Codirectional Link Interference

In a wireless communications system, communication may be categorized into different communications types based on different types of receiving nodes and sending nodes. Generally, sending information by a network device to a terminal device is referred to as downlink communication, and sending information by a terminal device to a network device is referred to as uplink communication. Communication is mainly categorized into TDD mode communication and FDD mode communication based on different duplex modes. In both the TDD mode and the FDD mode, it may occur that a plurality of network devices receive respective uplink signals simultaneously. In this case, uplink communication of a specific network device receives interference from uplink communication of a terminal device served by another network device. Such type of interference caused by uplink communication to uplink communication may be referred to as codirectional link interference. Likewise, downlink communication of a specific network device receives interference from downlink communication of the another network device, and such type of interference caused by downlink communication to downlink communication may be referred to as codirectional link interference. The codirectional link interference may also be referred to as codirectional interference.

Figure 1:
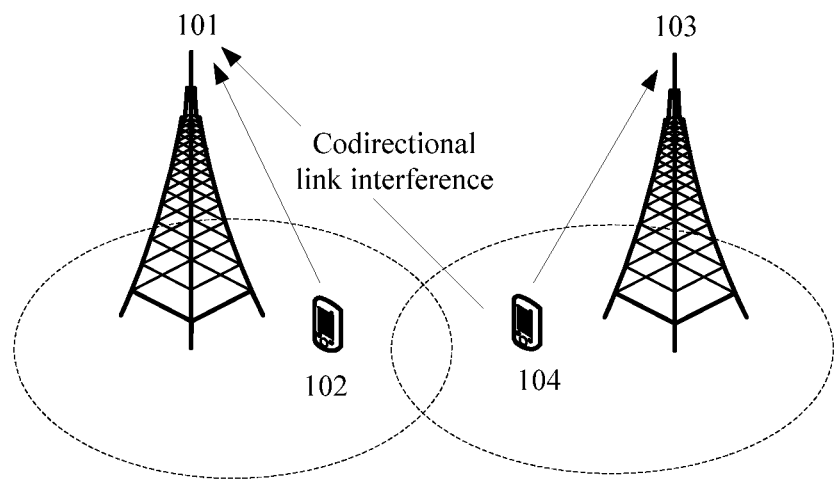
FIG. 1 is a schematic diagram of a communications scenario in which a network device receives codirectional link interference.

FIG. 1 is a schematic diagram of a communications scenario in which a network device receives codirectional link interference. As shown in FIG. 1, it is assumed that a network device 101 receives, within a first time period, an uplink signal of a terminal device 102 served by the network device 101 (for ease of description, the uplink signal sent by the terminal device 102 may be referred to as a first uplink signal), and a network device 103 receives, within the first time period, an uplink signal of a terminal device 104 served by the network device 103 (for ease of description, the uplink signal sent by the terminal device 104 may be referred to as a second uplink signal). In this case, the network device 101 can not only receive the first uplink signal but also receive the second uplink signal. The second uplink signal causes interference to the first uplink signal. The interference is codirectional link interference, and the interference signal is a codirectional link interference signal.

The codirectional link interference may also be referred to as inter-cell interference, co-channel interference, or codirectional interference.

2. Cross-Link Interference

To meet an actual requirement on uplink and downlink service volumes of a terminal device in a coverage area of each network device, a more flexible duplex technology is introduced to the prior-art TDD mode and FDD mode, so that a communications type of each cell may be individually configured according to an actual service requirement.

For example, a ratio of a time period used for uplink communication to a time period used for downlink communication for a cell in a relatively long time period may be determined based on a ratio of current uplink and downlink service volumes of the cell. Alternatively, a communications type within every time period may be dynamically adjusted, so that uplink communication or downlink communication can be performed in every time period in the TDD-mode communications system. For another example, in the FDD mode, an uplink frequency band may be used for downlink communication in some time periods according to a current actual requirement on uplink and downlink service volumes of a cell.

It can be learned that, if the flexible duplex technology is introduced to the TDD mode and the FDD mode, the communications type within every time period can be flexibly configured according to the actual requirement on uplink and downlink service volumes of the cell. This meets the actual requirement on uplink and downlink service volumes of the terminal device within the coverage area of each network device, thereby improving network resource utilization. However, with introduction of the flexible duplex technology, it may occur that some network devices perform uplink communication and some network devices perform downlink communication in a specific time period. In this case, uplink communication of a specific network device receives interference from downlink communication of another network device. In other words, interference may be caused between network devices, and such type of interference caused by downlink communication to uplink communication is referred to as cross-link interference. Likewise, downlink communication of a specific network device receives interference from uplink communication of another network device. In other words, interference may be caused between terminal devices, and such type of interference caused by uplink communication to downlink communication is referred to as cross-link interference. The cross-link interference may also be referred to as contradirectional interference.

Figure 2:
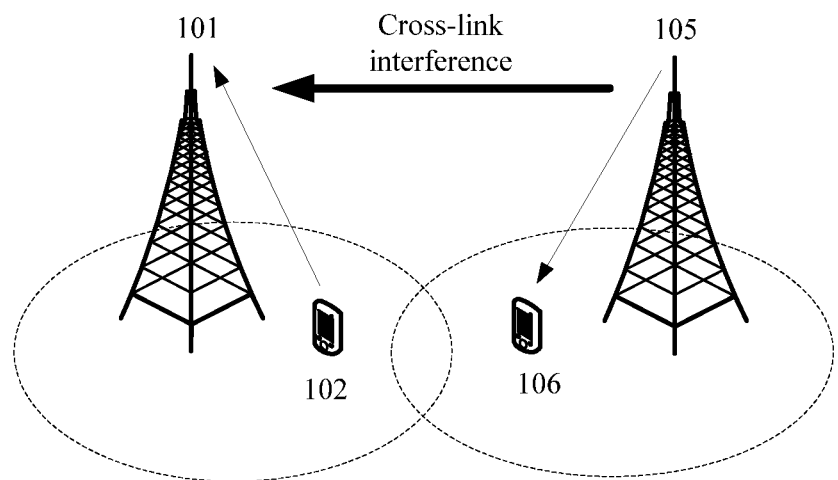
FIG. 2 is a schematic diagram of a communications scenario in which a network device receives cross-link interference.

FIG. 2 is a schematic diagram of a communications scenario in which a network device receives cross-link interference. As shown in FIG. 2, it is assumed that a network device 101 receives, within a first time period, an uplink signal of a terminal device 102 served by the network device 101 (for ease of description, the uplink signal sent by the terminal device 102 may be referred to as a first uplink signal), and a network device 105 sends, within the first time period, a downlink signal to a terminal device 106 served by the network device 105 (for ease of description, the downlink signal sent by the network device 105 may be referred to as a first downlink signal). In this case, the network device 101 can not only receive the first uplink signal but also receive the first downlink signal. The first downlink signal causes interference to the first uplink signal. The interference is cross-link interference, and the interference signal is a cross-link interference signal.

It should be understood that, a time period may be a subframe, a slot, a mini-slot, a symbol, or the like. Alternatively, a time period may be a plurality of subframes, a plurality of slots, a plurality of mini-slots, or a plurality of symbols.

It should be further understood that, if the flexible duplex technology is used, it may occur that some network devices perform uplink communication and some network devices perform downlink communication in a specific time period. Therefore, if the flexible duplex technology is used, it may be considered that interference received by a network device may include both codirectional link interference and cross-link interference. For the case in which a network device receives codirectional link interference if the flexible duplex technology is used, refer to the foregoing related descriptions. For brevity, details are not described herein again.

It should be further understood that, if a non-flexible duplex technology is used, for TDD, only uplink communication or downlink communication is performed within one time period; and for FDD, an uplink frequency band and a downlink frequency band are respectively used for uplink communication and downlink communication. Therefore, if the non-flexible duplex technology is used, it may be considered that interference received by a network device includes codirectional link interference but does not include cross-link interference.

Because a transmit power of a network device is usually far greater than a transmit power of a terminal device, if the flexible duplex technology is used, a downlink signal sent by a network device in a neighboring cell causes serious interference to receiving an uplink signal by a network device in a serving cell. Consequently, the uplink signal of the serving cell is unsuccessfully received.

In view of this, this application proposes an uplink power control method, so that impact of interference between network devices on uplink signal transmission can be reduced, thereby helping increase a probability of successfully receiving an uplink signal by a network device.

In the embodiments of this application, the network device is an apparatus deployed in a radio access network to provide a wireless communication function for a terminal device. The network device may include various forms of base stations, macro base stations, micro base stations (also referred to as small cells), relay nodes, access points, and the like. In systems using different radio access technologies, a device having a base station function may be termed differently. For example, the network device may be an access point (AP) in a WLAN, a base transceiver station (BTS) in GSM or CDMA, or an evolved NodeB (eNB or eNodeB) in an LTE system. Alternatively, the network device may be a NodeB (Node B) in a 3rd generation (3G) system. In addition, the network device may be a relay node, an access point, an in-vehicle device, a wearable device, a network device in a future 5G network, a network device in a future evolved public land mobile network (PLMN), or the like.

The terminal device in the embodiments of this application may also be referred to as user equipment (UE), an access terminal, a subscriber unit, a subscriber station, a mobile station (MS), a mobile console, a remote station, a remote terminal, a mobile device, a user terminal, a terminal, a wireless communications device, a user agent, or a user apparatus.

As an example but not a limitation, the terminal device used in the embodiments of this application may include various handheld devices, in-vehicle devices, wearable devices, or computing devices that have a wireless communication function, or other processing devices connected to a wireless modem. The terminal device may further include a subscriber unit, a cellular phone, a smartphone, a wireless signal card, a personal digital assistant (PDA) computer, a tablet computer, a wireless modem, a handheld device (handset), a laptop computer, a machine type communication (MTC) terminal, or a station (ST) in a wireless local area network (WLAN). The terminal device may be a cellular phone, a cordless telephone, a session initiation protocol (SIP) telephone, a wireless local loop (WLL) station, a terminal device in a next generation communications system, for example, a terminal device in a fifth generation (5G) communications network or a terminal device in a future evolved public land mobile network (PLMN) network, or the like.

Figure 3:
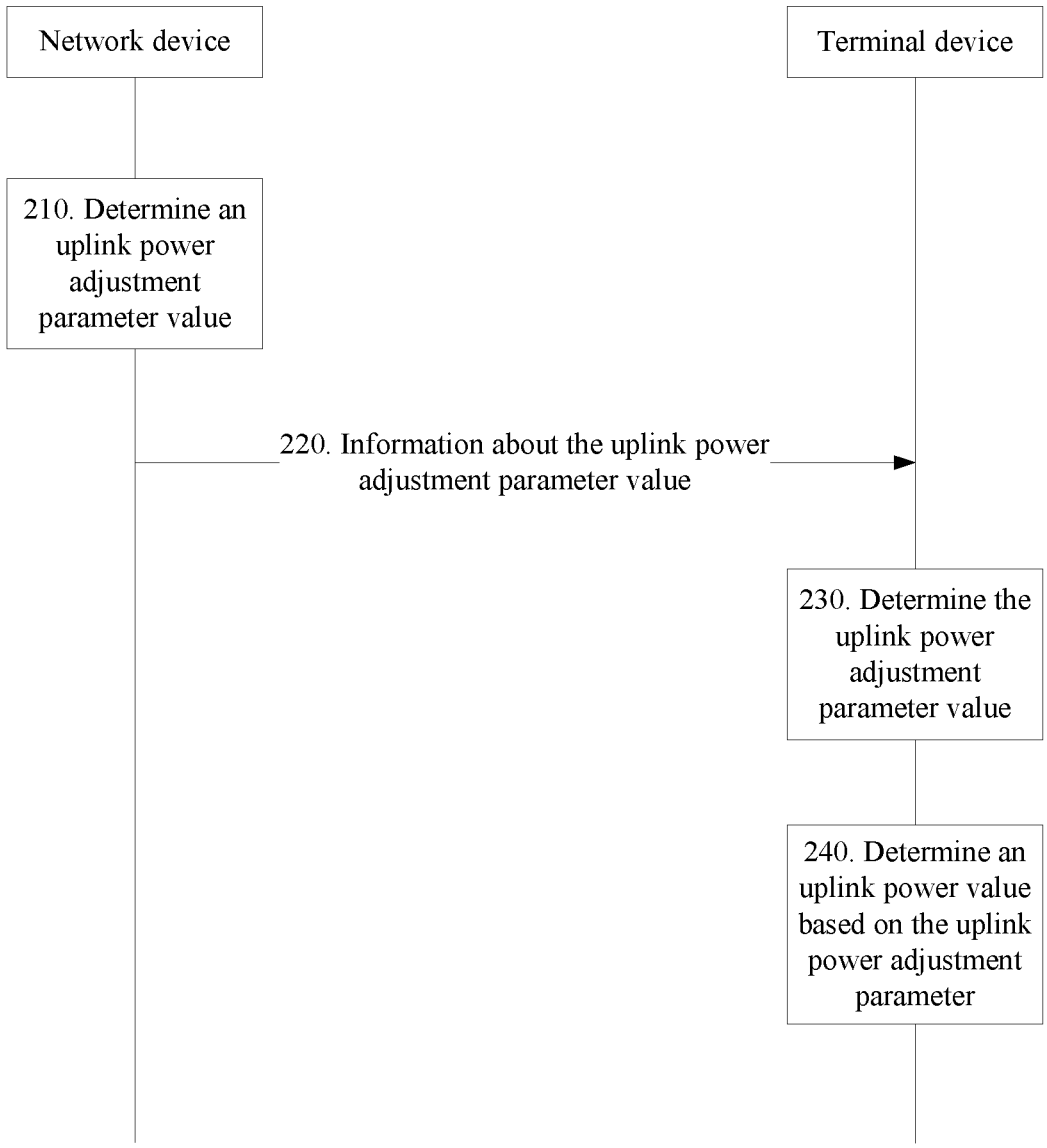
FIG. 3 is a schematic interaction diagram of an uplink power control method according to an embodiment of this application.

The following details an uplink power control method provided in the embodiments of this application with reference to FIG. 3.

FIG. 3 is a schematic interaction diagram of an uplink power control method according to an embodiment of this application. It should be understood that FIG. 3 shows detailed steps or operations of the uplink power control method. However, these steps or operations are merely an example. In this embodiment of this application, other operations or variations of the various operations in FIG. 3 may also be performed.

The method 200 may be performed by a network device and a terminal device. The network device and the terminal device may be respectively corresponding to the network device 101 and the terminal device 102 in the foregoing communications scenario. The terminal device is an example of any terminal device in a coverage area of the network device.

As shown in FIG. 3, the method 200 may include operations 210, 220, 230, and 240.

Operation 210. The network device determines an uplink power adjustment parameter value of the terminal device, where the uplink power adjustment parameter value is related to cross-link interference received by the network device.

It should be understood that the cross-link interference received by the network device may come from at least one network device adjacent to the network device. For example, the cross-link interference received by the network device includes the cross-link interference of the network device 105 in the foregoing application scenario.

Specifically, the network device may determine the uplink power adjustment parameter value in a plurality of manners. For example, the network device may determine the uplink power adjustment parameter value in the following several manners.

Manner 1

The network device may determine the uplink power adjustment parameter value according to a principle that a signal-to-interference ratio (SIR) determined when a cross-link interference power value is 0 is equal to an SIR determined when the cross-link interference power value is not 0 and based on interference received by the network device (the interference includes the cross-link interference received by the network device).

For ease of description, "the principle that the signal-to-interference ratio SIR determined when the cross-link interference power value is 0 is equal to the SIR determined when the cross-link interference power value is not 0" may be referred to as "a first principle".

It should be understood that, the SIR is an important indicator for measuring network quality. A smaller SIR means stronger interference received by a signal in a transmission process and a higher probability of a signal transmission failure. SIR=P/I, where P represents a receive power value of the network device (generally, the network device has a target receive power value, and P represents the target receive power value), and I represents an interference power value for receiving an interference signal by the network device. If the network device uses a non-flexible duplex technology, the network device usually has a relatively stable SIR. In this case, the SIR of the network device is equal to $P/I_s$, where $I_s$ represents a power value of codirectional link interference received by the network device.

If the network device uses a flexible duplex technology, interference received by the network device includes not only $I_u$ but also the cross-link interference power value $I_u$. If the receive power of the network device is still P, the SIR of the network device is equal to $P/(I_u+I_s)$. After the flexible duplex technology is used, the SIR of the network device is reduced. In addition, if the cross-link interference power value is larger, the SIR is reduced more greatly, so that receiving an uplink signal by the network device is seriously affected. Consequently, the network device is prone to unsuccessful reception of the uplink signal.

In view of this, in this embodiment of this application, the uplink power adjustment parameter value may be determined according to the first principle. For ease of description, "the uplink power adjustment parameter value determined according to the first principle" may be referred to as "a first candidate uplink power adjustment parameter value". The first principle may include a plurality of cases.

(1) In an example according to one embodiment of this application, the first principle may include making formula (1a) true:

$$P/I_s=(P+\Delta P)/(I_s+I_u) \tag{1a}$$

where P represents the target receive power value of the network device when the cross-link interference power value is 0, or P may be understood as the target receive power value of the network device in case of using the non-flexible duplex technology; $I_s$ represents the power value of the codirectional link interference received by the network device; $I_u$ represents the power value of the cross-link interference received by the network device; and $\Delta P$ represents an adjustment amount of the receive power value of the network device.

It should be noted that, in this embodiment of this application, all network devices in formulas related to $I_u$, $I_s$, or $\Delta P$ are general network devices, and is not the network device that performs the method in this application. For example, formula (1a) and the following formula (2a) to formula (4a) are theoretical deduction processes. In an actual application, a codirectional link interference power value and other parameters corresponding to a specific network device may be substituted into formula (1a) to formula (4a), to obtain an uplink power adjustment parameter value making a corresponding formula true.

Further, formula (2a) can be obtained according to formula (1a):

$$\Delta P=P^*I_u/I_s \tag{2a}$$

In this case, the target receive power of the network device is changed from P to $P+\Delta P=P^*(1+I_u/I_s)$. If the target receive power of the network device is $P^*(1+I_u/I_s)$, in an existing uplink power control formula, the transmit power of the terminal device is controlled by using a logarithm domain formula. In the uplink power control formula, the target receive power value is adjusted to $p=10 \log_{10}(P^*(1+I_u/I_s))=P^*10 \log_{10}+10 \log_{10}(1+I_u/I_s)$, where $10 \log_{10}P$ represents a prior-art $P_{O\_PUSCH}$, and $P_{O\_PUSCH}$ may be preconfigured for the terminal device through (Radio Resource Control, RRC) signaling.

Based on this, an adjustment formula used for determining the uplink adjustment parameter value may include:

$$\beta=10 \log_{10}(1+I_u/I_s) \tag{3a}$$

or $$\beta=I_u/I_s \tag{4a}$$

Correspondingly, the uplink power adjustment parameter value β determined by the network device can make the following true:

$$\beta=10 \log_{10}(1+I_1/I_0) \tag{5a}$$

or $$\beta=I_1/I_0 \tag{6a}$$

where $I_1$ represents the cross-link interference power value of the cross-link interference received by the network device, $I_{total}$ represents a total interference power value of the cross-link interference and the codirectional link interference received by the network device, and $I_0$ represents a codirectional link interference power value of codirectional link interference received by the network device or a codirectional link interference power value stored in the network device. The following further describes the uplink power adjustment parameter value that makes formula (5a) and formula (6a) true.

It should be understood that there is a correspondence between the uplink power adjustment parameter value and an incremental amount of the uplink power value (that is, ΔP). That the network device determines the uplink power adjustment parameter value according to the first principle is equivalent to that an incremental amount $P_1$ corresponding to the uplink power adjustment parameter value determined by the network device can make formula (7a) true:

$$P_0/I_0=(P_0+P_1)/(I_0+I_1) \qquad (7a)$$

where $P_0$ represents the target receive power value of the network device when the cross-link interference power value is 0; for $I_0$ and $I_1$, refer to the foregoing related descriptions; and $P_1$ represents a variation amount of a receive power value of the network device, and the variation amount is corresponding to the uplink power adjustment parameter value. In other words, $P_1$ represents an incremental amount by which a before-adjusted receive power value of the network device increases in comparison with a receive power value of the network device that is obtained after the uplink power of the terminal device is adjusted based on the uplink power adjustment parameter value.

It should be understood that, in this embodiment of this application, $P_1$ represents a theoretical value, and is not an actual incremental amount, of the receive power value, obtained after the network side device adjusts the uplink power based on the uplink power adjustment parameter value. In other words, a specific value of $P_1$ is obtained based on the uplink power adjustment parameter (specifically, $P_1$ is obtained by converting the uplink power adjustment parameter value), and is not the actual incremental amount of the receive power value of the network device. Further, in this embodiment of this application, that $P_1$ makes a specific formula true, for example, that $P_1$ makes formula (7a) true, means that $P_1$ theoretically makes formula (7a) true.

(2) In another example according to one embodiment, the first principle may include making formula (8a) true:

$$P/I_s=(P+\Delta P)/(I_t) \qquad (8a)$$

where $I_t$ represents a power value of total interference received by the network device; and for P, $I_s$, and ΔP, refer to the foregoing related descriptions, and for brevity, details are not described herein again.

Further, formula (9a) can be obtained according to formula (8a):

$$\Delta P=P*(I_t-I_s)/I_s \qquad (9a)$$

In this case, the target receive power of the network device is changed from P to P+ΔP=P*($I_t/I_s$). Reference may be made to the foregoing related descriptions. If the target receive power of the network device is P*($I_t/I_s$), in the uplink power control formula, the target receive power value is adjusted to p=10 $\log_{10}(P*(I_t/I_s))$=P*10 $\log_{10}$+10 $\log_{10}(I_t/I_s)$. For P*10 $\log_{10}$, refer to the foregoing related descriptions, and details are not described herein again in this application.

Based on this, an adjustment formula used for determining the uplink adjustment parameter value may include:

$$\beta=10 \log_{10}(I_t/I_s) \qquad (10a) \text{ or}$$

$$\beta=I_t/I_s \qquad (11a)$$

where for $I_t$, β, and $I_s$, refer to the foregoing related descriptions, and for brevity, details are not described herein again.

Correspondingly, the uplink power adjustment parameter value β determined by the network device can make either of the following formulas true:

$$\beta=10 \log_{10}(I_{total}/I_0) \qquad (12a) \text{ or}$$

$$\beta=I_{total}/I_0 \qquad (13a)$$

where $I_{total}$ represents a total interference power value of the codirectional link interference and the cross-link interference that are received by the network device; and for β and $I_0$, refer to the foregoing related descriptions, and for brevity, details are not described herein again.

It should be understood that there is a correspondence between the uplink power adjustment parameter value and an incremental amount of the uplink power value (that is, ΔP). That the network device determines the uplink power adjustment parameter value according to the first principle is equivalent to that the incremental amount $P_1$ corresponding to the uplink power adjustment parameter value determined by the network device can make formula (14a) true:

$$P_0/I_0=(P_0+P_1)/(I_{total}) \qquad (14a)$$

where $I_{total}$ represents a power value of total interference received by the network device; and for $P_0$, $I_0$, and $P_1$, refer to the foregoing related descriptions, and for brevity, details are not described herein again.

Manner 2

The network device determines the uplink power adjustment parameter value according to a principle that a signal to interference plus noise ratio (SINR) determined when a cross-link interference power value is 0 is equal to an SINR determined when the cross-link interference power value is not 0 and based on interference received by the network device.

For ease of description, "the principle that the signal to interference plus noise ratio SINR determined when the cross-link interference power value is 0 is equal to the SINR determined when the cross-link interference power value is not 0" may be referred to as "a second principle".

It should be understood that, the SINR is an important indicator for measuring network quality. A smaller SINR means stronger interference received by a signal in a transmission process and a higher probability of a signal transmission failure. SINR=P/(I+N), where for P and I, refer to the foregoing related descriptions; and N represents a noise interference power value, and N is related to noise of a receiver of the network device. Similar to the SIR, if the network device uses the non-flexible duplex technology, the network device usually has a relatively stable SINR. In this case, the SINR of the network device is equal to P/($I_s$+N).

However, if the flexible duplex technology is used, and the receive power of the network device is still P, the SINR of the network device is reduced. In addition, if the cross-link interference power value is larger, the SINR is reduced more greatly, so that receiving an uplink signal by the network device is seriously affected. Consequently, the network device is prone to unsuccessful reception of the uplink signal.

In view of this, in this embodiment of this application, the uplink power adjustment parameter value may be determined according to the second principle. For ease of description, "the uplink power adjustment parameter value determined according to the second principle" may be referred to as "a second uplink power adjustment parameter value". The second principle may include a plurality of cases.

(1) In an example according to one embodiment of this application, the second principle may include making formula (1b) true:

$$P/I_s=(P+\Delta P)/(I_s+I_u+N) \quad (1b)$$

where for P, $I_s$, $\Delta P$, and N, refer to the foregoing related descriptions, and for brevity, details are not described herein again.

Further, formula (2b) can be obtained according to formula (1b):

$$\Delta P=P*I_u/(I_s+N) \quad (2b)$$

In this case, the target receive power of the network device is changed from P to $P+\Delta P=P*(1+I_u/(I_s+N))$. Reference may be made to the foregoing related descriptions. If the target receive power of the network device is $P*(1+I_u/(I_s+N))P*(I_t/I_s)$, in the uplink power control formula, the target receive power value is adjusted to $p=10 \log_{10}(P*(1+I_u/(I_s+N)))=P*10 \log_{10}+10 \log_{10}(1+I_u/(I_s+N))$. For $P_{O\_PUSCH}$, refer to the foregoing related descriptions, and details are not described herein again in this application.

Based on this, an adjustment formula used for determining the uplink adjustment parameter value may include:

$$\beta=10 \log_{10}(1+I_u/(I_s+N)) \quad (3b) \text{ or}$$

$$\beta=I_1/(I_s+N) \quad (4b)$$

where for $I_u$, $I_s$, and N, refer to the foregoing related descriptions, and for brevity, details are not described herein again.

Correspondingly, the uplink power adjustment parameter value $\beta$ determined by the network device can make the following formula true:

$$\beta=10 \log_{10}(1+I_1/(I_0+N)) \quad (5b) \text{ or}$$

$$\beta=I_1/(I_0+N) \quad (6b)$$

where for $\beta$, $I_1$, $I_0$, and N, refer to the foregoing related descriptions, and for brevity, details are not described herein again.

It should be understood that, that the network device determines the uplink power adjustment parameter value according to the first principle is equivalent to that the incremental amount $P_1$ corresponding to the uplink power adjustment parameter value determined by the network device can make formula (7b) true:

$$P_0/I_0=(P_0+P_1)/(I_0+I_1+N) \quad (7b)$$

where for $P_0$, $I_0$, $P_1$, $I_1$, and N, refer to the foregoing related descriptions, and for brevity, details are not described herein again.

(2) In another example according to one embodiment, the second principle may include making formula (8b) true:

$$P/I_s=(P+\Delta P)/(I_t+N) \quad (8b)$$

where $I_t$ represents a power value of total interference received by the network device; and for P, $I_s$, and $\Delta P$, refer to the foregoing related descriptions, and for brevity, details are not described herein again.

Further, formula (9b) can be obtained according to formula (8b):

$$\Delta P=P*(I_t-I_s)/I_s \quad (9b)$$

In this case, the target receive power of the network device is changed from P to $P+\Delta P=P*(I_t/I_s)$. Similar to the foregoing descriptions, in case of not considering a path loss, a transmit power of the terminal device is $p=10 \log_{10}(P*(I_t/I_s))=P*10 \log_{10}+10 \log_{10}(I_t/I_s)$. For $P_{O\_PUSCH}$, refer to the foregoing related descriptions, and details are not described herein again in this application.

Based on this, an adjustment formula used for determining the uplink adjustment parameter value may include:

$$\beta=10 \log_{10}((I_t+N)/(I_s+N)) \quad (10b) \text{ or}$$

$$\beta=(I_t+N)/(I_s+N) \quad (11b)$$

where for $I_t$, $I_s$, and N, refer to the foregoing related descriptions, and for brevity, details are not described herein again.

Correspondingly, the uplink power adjustment parameter value $\beta$ determined by the network device can make the following formula true:

$$\beta=10 \log_{10}((I_{total}+N)/(I_0+N)) \quad (12b) \text{ or}$$

$$\beta=(I_{total}+N)/(I_0+N) \quad (13b)$$

where $I_{total}$ represents a power value of total interference received by the network device; and for $\beta$, $I_0$, and N, refer to the foregoing related descriptions, and for brevity, details are not described herein again.

It should be understood that, that the network device determines the uplink power adjustment parameter value according to the first principle is equivalent to that the incremental amount $P_1$ corresponding to the uplink power adjustment parameter value determined by the network device can make formula (14b) true:

$$P_0/I_0=(P_0+P_1)/(I_{total}) \quad (14b)$$

where for $P_0$, $I_0$, $P_1$, and $I_{total}$, refer to the foregoing related descriptions, and for brevity, details are not described herein again.

It should be understood that the formulas related to determining the uplink power adjustment parameter are merely instances, and other formulas may be obtained through variations of the foregoing formulas.

It should be further understood that, in this embodiment of this application, determining the uplink power adjustment parameter value according to a specific principle is equivalent to that the incremental amount $P_1$ that is of the receive power value of the network device and that is corresponding to the uplink power adjustment parameter value makes the principle true. For example, it is assumed that determining the uplink power adjustment parameter value according to the first principle may be equivalent to that the uplink power adjustment parameter value is corresponding to $P_1$, and $P_1$ makes the following true: the signal-to-interference ratio SIR of the network device determined when the cross-link interference power value is 0 is equal to the SIR of the network device determined when the cross-link interference power value is not 0. For another example, it is assumed that determining the uplink power adjustment parameter value according to the second principle may be equivalent to that the uplink power adjustment parameter value is corresponding to $P_1$, and $P_1$ makes the following true: the signal to interference plus noise ratio SINR of the network device determined when the cross-link interference power value is 0 is equal to the SINR of the network device determined when the cross-link interference power value is not 0.

Manner 3

The network device determines the uplink power adjustment parameter value from a plurality of candidate uplink power adjustment parameter values (or a set including a plurality of candidate uplink power adjustment parameter values).

In other words, the network device may select one of the plurality of candidate uplink power adjustment parameter values (or from the set including the plurality of candidate uplink power adjustment parameter values) as the uplink power adjustment parameter value.

For ease of description, the "selected candidate uplink power adjustment parameter value" is referred to as a "first candidate uplink power adjustment parameter value". The following uses an example in which the network device selects the first candidate uplink power parameter value from a set to describe this application.

Specifically, the network device may select the first candidate uplink power adjustment parameter value from the set in a plurality of manners.

For example, the network device may select the first candidate uplink power adjustment parameter value based on time periods. Specifically, it is assumed that the network device receives different interference at different time periods, and the network device may select the first candidate uplink power adjustment parameter value based on the time periods.

For another example, the network device may determine a parameter related to the uplink power adjustment parameter value, where different parameters are corresponding to different candidate uplink power parameter values, and the network device may select the first candidate uplink power adjustment parameter value based on the determined parameter.

Further, the network device may obtain the plurality of candidate uplink power adjustment parameter values (or the set including the plurality of candidate uplink power adjustment parameter values) in a plurality of manners.

For example, the network device may determine the plurality of candidate uplink power adjustment parameters through simulation, measurement, or another manner, and the network device may configure the plurality of candidate uplink power adjustment parameters for a terminal device through radio resource control (Radio Resource Control, RRC) signaling.

Specifically, a statistical relationship of a ratio of a cross-link interference power to a codirectional link interference power can be obtained according to system simulation, actual measurement, or a system design requirement (the system design requirement herein means that, an interference management method needs to be used after the flexible duplex technology is used, to maintain the cross-link interference power within a level, so that a system may properly work), and the plurality of candidate uplink power adjustment parameter values may be obtained according to the foregoing formula. For example, if it is expected that the determined plurality of candidate uplink power adjustment parameters make formula (3a) true, that is, make $\beta=10 \log_{10}(1+I_u/I_s)$ true, the set may be obtained by substituting frequently-used optional values of $I_u/I_s$ into formula (3a). For example, it is assumed that the optional values of $I_u/I_s$ include 1, 2, 4, 8, 9, 10, 20, and 100, and the set {3, 4.8, 7, 9.5, 10, 10.5, 13, 20} may be obtained based on the plurality of optional values. Likewise, a set of another type may be obtained, to make a corresponding formula true.

For another example, both the network device and the terminal device may receive the set that includes the plurality of candidate uplink power parameter values, sent by another device.

In one embodiment, after obtaining the set, the network device and the terminal device may store the set, to subsequently determine, based on the set, the uplink power adjustment parameter value or the information about the uplink power adjustment parameter value.

It should be understood that, the foregoing several manners are merely possible implementations of this embodiment of this application. The network device may determine the uplink power adjustment parameter value in another manner. For example, the network device may store a correspondence between a cross-link interference power value and an uplink power adjustment parameter. For example, if the cross-link interference power value ranges from A to $(A+\Delta a)$, correspondingly the uplink power adjustment parameter is B1; or if the cross-link interference power value ranges from $(A+\Delta a)$ to $(A+2\Delta a)$, correspondingly the uplink power adjustment parameter value is B2.

The foregoing describes the several manners of determining the uplink power parameter value by the network device. The network device may determine the total interference power value, the cross-link interference power value, or the codirectional link interference power value of the network device at least in the following manners.

1. Cross-Link Interference Power Value

1a. Determine the cross-link interference power value by receiving a pilot signal.

Specifically, the pilot signal may be determined through negotiation between network devices, to be dedicatedly used for measuring interference between the network devices. The network device may determine a power value of cross-link interference from another network device by receiving the pilot signal. For example, the network device may determine that the receive power value at which the pilot signal is received is equal to the cross-link interference power value.

For ease of description, the network device that performs the embodiment method of this application may be referred to as a first network device, and a network device that causes cross-link interference to the first the network device is referred to as a second network device.

It should be understood that, the second network device includes at least one network device adjacent to the first network device (in other words, coverage areas overlap). For example, the second network device may include the network device 105 in the foregoing application scenario.

1b. Determine the cross-link interference power value based on at least one of transmit power information of the second network device, information about a distance between the network device and the second network device, information about path loss between the network device and the second network device, and the like.

Specifically, the first network device may store at least one of the transmit power information, the distance information, and the path loss information, or the first network device may obtain at least one of the transmit power information, the distance information, and the path loss information from another device. This is not limited herein in this application. The first network device may estimate the cross-link interference power value based on at least one of this type of information, with no need to detect the pilot signal.

2. Codirectional Link Interference Power Value

2a. Determine the codirectional link interference power value by receiving an uplink signal from a third network device.

It should be understood that the third network device may include at least one network device adjacent to the network device. For example, the third network device may include the network device 103 in the foregoing application scenario. It should be further understood that the third network device and the second network device may include a same network device or different network devices. This is not limited herein in this embodiment of this application.

It should be noted that, the network device may identify, in a plurality of manners, an uplink signal belonging to the network device and an uplink signal belonging to another network device. For ease of description, an uplink signal that is sent by a terminal device served by the network device may be referred to as a first uplink signal. For example, the network device may identify, based on an identity (for example, a cell ID, or a cyclic shift (cyclicShift) of a sequence) carried in the first uplink signal, the uplink signal that is sent by the terminal device served by the network device, to distinguish between the uplink signal that is sent by the terminal device served by the network device and an uplink signal that is sent by a terminal device served by another network device.

2b. The network device stores the codirectional link interference power value.

Specifically, the network device may obtain the codirectional link interference power value in a plurality of manners and store the codirectional link interference power value, so that the network device may directly use the codirectional link interference power value when determining the uplink power adjustment parameter value subsequently, thereby improving efficiency of determining the uplink power adjustment parameter value.

3. Total Interference Power Value

3a. Determine the total interference power value by receiving a first signal.

3a-1. The total interference power value is a sum of a codirectional link interference power value and a cross-link interference power value. The network device may obtain the codirectional link interference power value and the cross-link interference power value by receiving the first signal, to further obtain the total interference power value.

3a-2. If there is no pilot signal between network devices that is dedicatedly used for measuring interference between the network devices, the network device may not distinguish between a cross-link interference signal and a codirectional link interference signal in the first signal after receiving the first signal, and the network device may determine the total interference power value. For example, the network device may determine a difference between a receive power value at which the first signal is received and a receive power value at which a first uplink signal is received as the total interference power value.

3b. Obtain the contradirectional power value in the manner 1b, and obtain the codirectional link interference power value in the manner 2b, to estimate the total interference power value.

For detailed descriptions of 3b, refer to the foregoing related descriptions. For brevity, details are not described herein again.

In one embodiment, before 210, the method 200 may further include:

the second network device sends transmission information to the first network device, and correspondingly the first network device receives the transmission information sent by the second network device.

Specifically, the transmission information is used to indicate the second network device and the first network device have different communications types, or the transmission information is used by the first network device to determine that the first network device and the second network device have different communications types. Because the first network device and the second network device have different communications types, the second network device causes cross-link interference to the first network device. To reduce impact of the cross-link interference on receiving an uplink signal by the network device, the first network device (needs to) determines the uplink power adjustment parameter value.

Optionally, in one embodiment of this application, operation 210 may include:

the first network device determines the uplink power adjustment parameter value at which the terminal device sends the uplink signal at a first frequency band.

For example, the network device may determine, based on at least two of the cross-link interference power value, the codirectional link interference power value, and the total interference power value that are corresponding to a frequency band ranging from 10 M to 20 M, an uplink power adjustment parameter value at the frequency band ranging from 10 M to 20 M. The uplink power adjustment parameter value at the frequency band ranging from 10 M to 20 M is used by the terminal device to determine an uplink power value at the frequency band ranging from 10 M to 20 M. Likewise, the network device may determine an uplink power adjustment parameter value at a frequency band ranging from 0 M to 10 M, where the uplink power adjustment parameter value at the frequency band ranging from 0 M to 10 M is used by the terminal device to determine an uplink power value at the frequency band ranging from 0 M to 10 M.

In other words, in the method in this embodiment of this application, the network device may determine, specific to different frequency bands, an uplink power adjustment parameter value corresponding to a frequency band, and the terminal device may determine an uplink power value at the corresponding frequency band, to help the terminal device accurately determine the uplink power value.

In another example according to one embodiment, the network device determines the uplink power adjustment parameter value at which the terminal device sends the uplink signal at the first frequency band.

Specifically, the uplink power adjustment parameter may be alternatively applicable to some terminal devices served by the network device (for example, terminal devices at the first frequency band). In other words, the network device may determine different uplink power adjustment parameters for different terminal devices.

It should be understood that the foregoing first frequency band is full bandwidth or partial bandwidth.

Operation 230. The network device sends the information about the uplink power adjustment parameter value to the terminal device, and correspondingly the terminal device receives the information about the uplink power adjustment parameter value, sent by the network device.

In an example according to one embodiment, the information about an uplink power adjustment parameter value may be used to indicate the uplink power adjustment parameter value.

In another example according to one embodiment, a plurality of candidate uplink power adjustment parameter values are known to the network device and the terminal device (or the set including the plurality of candidate uplink power adjustment parameter values is known to the network device and the terminal device). The information about the uplink power adjustment parameter value may be used to indicate one of the plurality of candidate uplink power adjustment parameter values. In one embodiment, the uplink power parameter value information may be an identity of the candidate uplink power adjustment parameter value. In other words, it is assumed that the information about the uplink power adjustment parameter value may be used to indicate the first candidate uplink power adjustment parameter value of the plurality of candidate uplink power adjustment parameter values, and the information about the uplink power adjustment parameter value may be an identity of the first candidate uplink power adjustment parameter value.

For related descriptions about the plurality of candidate uplink power adjustment parameter values or the set, refer to the foregoing related descriptions. For brevity, details are not described herein again.

Specifically, it is assumed that the network device determines the uplink power adjustment parameter value in Manner 1 or Manner 2, and the network device may determine, from the plurality of candidate uplink power adjustment parameter values based on the determined uplink power adjustment parameter value, one candidate uplink power adjustment parameter value with a minimum difference with the determined uplink power adjustment parameter value. For ease of description, "the uplink power adjustment parameter value determined by the network device" may be referred to as "a target uplink adjustment parameter value". The plurality of candidate uplink power adjustment parameter values are known to both the network device and the terminal device served by the network device. In this case, the network device may determine, from the plurality of candidate uplink power adjustment parameter values, the candidate uplink power adjustment parameter value with the minimum difference with the target uplink adjustment parameter value. The information about the uplink power adjustment parameter value is used to indicate the candidate uplink power adjustment parameter value selected by the network device. This manner helps reduce overheads for feeding back the information about the uplink power adjustment parameter value.

For another example, it is assumed that the network device determines the uplink power adjustment parameter value in Manner 3, and the information about the uplink power adjustment parameter value may be the identity of the uplink adjustment parameter value. For details, refer to the foregoing related descriptions. For brevity, details are not described herein again.

It is assumed that the uplink power adjustment parameter value includes eight elements, and the information about the uplink power adjustment parameter value may occupy three bits, used to indicate the first candidate uplink power adjustment parameter, so that information transmission overheads can be reduced.

Further, the information about the uplink power adjustment parameter value may be carried in downlink control information. The downlink control information may not include uplink scheduling information. In other words, the uplink scheduling information (Uplink, grant) and the information about the uplink power adjustment parameter value may be sent in different downlink control information at different time periods. The downlink control information may be downlink control information dedicated to the terminal device or downlink control information common to a group of terminal devices.

Operation 240. The terminal device determines the uplink power adjustment parameter value based on the information about the uplink power adjustment parameter value.

Specifically, if the information about the uplink power adjustment parameter value is used to indicate the uplink power adjustment parameter value, the terminal device may determine the uplink power adjustment parameter value based on the information about the uplink power adjustment parameter value. If the information about the uplink power adjustment parameter value is used to indicate one of the plurality of candidate uplink power adjustment parameter values (for example, the first candidate uplink power adjustment parameter value), for example, if the information about the uplink power adjustment parameter value is the identity of the first candidate uplink power adjustment parameter value, the terminal device may select one of the plurality of candidate uplink power adjustment parameter values based on the information about the uplink power adjustment parameter value.

In one embodiment, the terminal device may store a correspondence between information about an uplink power adjustment parameter value and a candidate uplink power adjustment parameter value (for example, a correspondence between identity information and a candidate uplink power adjustment parameter value), the terminal device may select, from the plurality of candidate uplink power adjustment parameter values based on the information about the uplink power adjustment parameter value and the correspondence, the candidate uplink power adjustment parameter value corresponding to the information about the uplink power adjustment parameter value. The correspondence may be in a table form or in another form, and this is not limited herein in this embodiment of this application.

Operation 250. The terminal device determines the uplink power value based on the uplink power adjustment parameter value.

In this embodiment of this application, the uplink power value determined by the terminal device is related to cross-link interference received by the network device, and this helps reduce impact of interference between network devices on uplink signal transmission, thereby helping increase a probability of successfully receiving an uplink signal by the network device.

Further, in an optional example, the uplink power value can make the following formula true:

$$P=\min\{P_{max}, F(M,P_0,\alpha)+\beta\} \quad (15)$$

$$P=\min\{P_{max}, F(M,P_0,\alpha)+10\log_{10}(1+\beta)\} \quad (16) \text{ or}$$

$$P=\min\{P_{max}, F(M,P_0,\alpha)+10\log_{10}\beta\} \quad (17)$$

where P represents the uplink power value of the terminal device, min { } means to calculate a minimum value, $P_{max}$ represents a maximum uplink power value allowed by the terminal device, M represents a quantity of resource blocks used when the terminal device sends an uplink signal, $P_0$ represents a target receive power value of the network device when the cross-link interference power value is 0, α represents a path loss compensation parameter, β represents the uplink power adjustment parameter value, and F(M, $P_0$, αa) represents a function related to M, $P_0$, and α.

It should be understood that, it can be learned that β may be of a plurality of types, and correspondingly the terminal device can obtain, based on different types of β, uplink power values making different formulas true.

For example, it is assumed that β makes formula (5a), formula (12a), formula (5b), or formula (12b) true, and the uplink power value determined by the terminal device can make formula (15) true.

For another example, it is assumed that β makes formula (6a) or formula (6b) true, and the uplink power value determined by the terminal device can make formula (16) true.

Still for example, it is assumed that β makes formula (13a) or formula (13b) true, and the uplink power value determined by the terminal device can make formula (17) true.

Optionally, the terminal device may determine the $i^{th}$ scheduling unit (for example, an uplink power value in the $i^{th}$ subframe).

Formula (15) is used as an example $P(i)=\min\{P_{max}(i), F(M(i), P_0, \alpha)+\beta\}$ or $P=\min\{P_{max}(i), F(M(i), P_0, \alpha)+\beta(i)\}$, where P(i) represents an uplink power value for sending an uplink signal in the $i^{th}$ scheduling unit by the terminal device; for min{ } and $\alpha_c$, refer to the foregoing related descriptions; $P_{max}(i)$ represents a maximum uplink power value allowed by the terminal device in the $i^{th}$ scheduling unit; β(i) represents a quantity of RBs used for sending an uplink signal in the $i^{th}$ scheduling unit; and OW represents the determined uplink power adjustment parameter value corresponding to the $i^{th}$ scheduling unit.

Further, in one embodiment, based on the method for determining an uplink power value in an existing long term evolution (Long Term Evolution, LTE) system, in this embodiment of this application, formula (15) is used as an example, and the uplink power value determined by the terminal device can make formula (18) or formula (19) true:

$$P_{PUSCH,c}(i)=\min\{P_{CMAX,c}(i), 10 \log_{10}(M_{PUSCH,c}(i))+ P_{O\_PUSCH,c}(j)+\beta+\alpha_c(j)\cdot PL_C+\Delta_{TF,c}(i+f_c(i))\} \quad (18), \text{ or}$$

$$P_{PUSCH,c}(i)=\min\{P_{CMAX,c}(i), 10 \log_{10}(M_{PUSCH,c}(i))+ P_{O\_PUSCH,c}(j)+\beta(i)+\alpha_c(j)\cdot PL_C+\Delta_{TF,c}(i+f_c(i))\} \quad (19)$$

where $P_{PUSCH,c}(i)$ represents the uplink power value sent by the terminal device in the $i^{th}$ scheduling unit; min{ } means to calculate a minimum value; $P_{CMAX,c}(i)$ represents a maximum uplink power value allowed by the terminal device in the $i^{th}$ scheduling unit; $M_{PUSCH,c}(i)$ represents a quantity of RBs used for sending an uplink signal in the $i^{th}$ scheduling unit; $P_{O\_PUSCH,c}(j)$ represents the target receive power value of the network device (a target receive power of the network device in the non-flexible duplex technology may be corresponding to $P_0$ in the foregoing formula (15) to formula (17)); $\alpha_c(j)$ represents a network device-specific path loss compensation parameter controlled through higher layer signaling; $PL_C$ represents a path loss value obtained through measurement by the terminal device; $\Delta_{TF,c}(i)$ represents an adjustment amount related to a transport format, and is related to a modulation and coding scheme used during transmission; and $f_c(i)$ is related to a power control command, where $f_c(i)$ includes two types: an accumulative type and a non-accumulative type.

Non-accumulative type: $f_c(i)=\delta_{PUSCH,c}(i-K_{PUSCH})$, where $\delta_{PUSCH,c}$ represents a power control command, where the power control command may be notified by using downlink control information; i represents a current sending time point; and $K_{PUSCH}$ represents a difference between the current sending time point i and a subframe of the downlink control information carrying the power control command. In other words, the power control command used in uplink transmission that is sent at the $i^{th}$ time point is notified at the $(i-K_{PUSCH})^{th}$ time point.

Accumulative type: $f_c(i)=f_c(i-1)+\delta_{PUSCH,c}(i-K_{PUSCH})$, where for $\delta_{PUSCH,c}$, i, and $K_{PUSCH}$, refer to the foregoing related descriptions; and $f_c(i)$ used for uplink transmission that is sent at the $i^{th}$ time point is related to $f_c(i-1)$ used for uplink transmission sent at the $(i-1)^{th}$ time point and the power control command notified at the $(i-K_{PUSCH})^{th}$ time point.

In this application, the uplink power adjustment parameter value β is used for determining the uplink power value. In case of using the flexible duplex technology in a system, using the uplink power adjustment parameter value β helps maintain the SIR or the SINR of the network device, thereby reducing impact of the cross-link interference power value on system network quality.

It should be understood that, for specific descriptions that the uplink power value makes formula (16) or formula (17) true, reference may be made to the foregoing related descriptions about that the uplink power value can make formula (15) true. For brevity, details are not described herein again.

Figure 4:
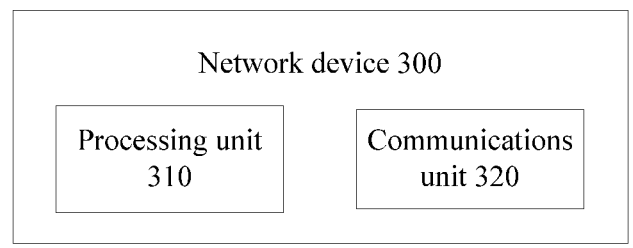
FIG. 4 is a schematic block diagram of an example of a network device according to an embodiment of this application.

FIG. 4 is a schematic block diagram of an example of a network device according to an embodiment of this application. As shown in FIG. 4, the network device 300 includes:

a processing unit 310, configured to determine an uplink power adjustment parameter value of a terminal device, where the uplink power adjustment parameter value is related to cross-link interference received by the network device 300; and a communications unit 320, configured to send, to the terminal device, information about the uplink power adjustment parameter value determined by the processing unit 310.

Optionally, the uplink power adjustment parameter value is corresponding to $P_1$, and $P_1$ makes the following true: a signal-to-interference ratio SIR of the network device 300 determined when the cross-link interference power value is 0 is equal to an SIR of the network device 300 determined when the cross-link interference power value is not 0; or the uplink power adjustment parameter value is corresponding to $P_1$, and $P_1$ makes the following true: a signal to interference plus noise ratio SINR of the network device 300 determined when the cross-link interference power value is 0 is equal to an SINR of the network device 300 determined when the cross-link interference power value is not 0, where $P_1$ represents a variation amount of a receive power value of the network device 300, and the variation amount is corresponding to the uplink power adjustment parameter value.

In one embodiment, that $P_1$ makes the following true: a signal-to-interference ratio SIR of the network device 300 determined when the cross-link interference power value is 0 is equal to an SIR of the network device 300 determined when the cross-link interference power value is not 0 includes that $P_1$ makes the following formula true: $P_0/I_0 = (P_0+P_1)/(I_0+I_1)$ or $P_0/I_0=(P_0+P_1)/(I_{total})$, where $P_0$ represents a target receive power value of the network device 300 when the cross-link interference power value is 0, $I_0$ represents a codirectional link interference power value of codirectional link interference received by the network device 300 or a codirectional link interference power value stored in the network device 300, $I_1$ represents a cross-link interference power value of cross-link interference received by the network device 300, and $I_{total}$ represents a total interference power value of the cross-link interference and the codirectional link interference received by the network device 300.

In one embodiment, the uplink power adjustment parameter value is β, and makes the following formula true: $\beta=10 \log_{10}(1+I_1/I_0)$; $\beta=10 \log_{10}(I_{total}/I_0)$; $\beta=I_1/I_0$; or $\beta=I_{total}/I_0$, where $I_0$ represents the codirectional link interference power value of the codirectional link interference received by the network device 300 or the codirectional link interference power value stored in the network device 300, $I_1$ represents the cross-link interference power value of the cross-link interference received by the network device 300, and $I_{total}$ represents the total interference power value of the cross-link interference and the codirectional link interference received by the network device 300.

In one embodiment, that $P_1$ makes the following true: a signal to interference plus noise ratio SINR of the network device 300 determined when the cross-link interference power value is 0 is equal to an SINR of the network device 300 determined when the cross-link interference power value is not 0 includes that $P_1$ makes the following formula true: $P_0/(I_0+N)=(P_0+P_1)/(I_0+I_1+N)$ or $P_0/I_0=(P_0+P_1)/(I_{total}+N)$, where $P_0$ represents a target receive power value of the network device 300 when the cross-link interference power value is 0, $I_0$ represents a codirectional link interference power value of codirectional link interference received by the network device 300 or a codirectional link interference power value stored in the network device 300, $I_1$ represents a cross-link interference power value of cross-link interference received by the network device 300, $I_{total}$ represents a total interference power value of the cross-link interference and the codirectional link interference received by the network device 300, and N represents a noise power value of the network device 300.

In one embodiment, the uplink power adjustment parameter value is β, and makes the following formula true: $β=10 \log_{10}(1+I_1/(I_0+N))$; $β=10 \log_{10}((I_{total}+N)/(I_0+N))$; $β=I_1/(I_0+N)$; or $β=(I_{total}+N)/(I_0+N)$, where $I_0$ represents the codirectional link interference power value of the codirectional link interference received by the network device 300 or the codirectional link interference power value stored in the network device 300, $I_1$ represents the cross-link interference power value of the cross-link interference received by the network device 300, $I_{total}$ represents the total interference power value of the cross-link interference and the codirectional link interference received by the network device 300, and N represents the noise power value.

In one embodiment, the processing unit 310 is further configured to: select, from a plurality of candidate uplink power adjustment parameter values based on the determined uplink power adjustment parameter value, a candidate uplink power adjustment parameter value with a minimum difference with the determined uplink power adjustment parameter value, where the information about the uplink power adjustment parameter value is used to indicate the candidate uplink power adjustment parameter value selected by the network device 300.

In one embodiment, the processing unit 310 is specifically configured to select one of the plurality of candidate uplink power adjustment parameter values as the uplink power adjustment parameter value.

In one embodiment, the plurality of candidate uplink power adjustment parameter values include candidate uplink power adjustment parameter values being 3, 4.8, 7, 9.5, 10, 10.5, 13, or 20.

In one embodiment, within one time period at one frequency band, the network device 300 and a network device adjacent to the network device 300 may have different communications types.

In one embodiment, the uplink power adjustment parameter value makes the following formula true: $P=\min\{P_{max}, F(M, P_0, α)+β\}$; $P=\min\{P_{max}, F(M, P_0, α)+10 \log_{10}(1+β)\}$; or $P=\min\{P_{max}, F(M, P_0, α)+10 \log_{10}β\}$, where P represents an uplink power value of the terminal device, min{ } means to calculate a minimum value, $P_{max}$ represents a maximum uplink power value allowed by the terminal device, M represents a quantity of resource blocks used when the terminal device sends an uplink signal, $P_0$ represents the target receive power value of the network device 300 when the cross-link interference power value is 0, α represents a path loss compensation parameter, β represents the uplink power adjustment parameter value, and $F(M, P_0, α)$ represents a function related to M, $P_0$, and α.

It should be understood that, the units of the network device 300 provided in this embodiment of this application and the foregoing other operations or functions are used to implement corresponding procedures executed by the network device in the uplink power control method provided in the embodiment of this application. For brevity, details are not described herein again.

Figure 5:
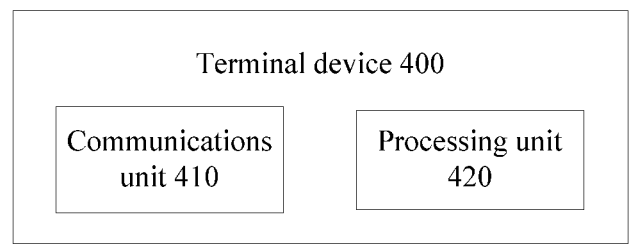
FIG. 5 is a schematic block diagram of an example of a terminal device according to an embodiment of this application.

FIG. 5 is a schematic block diagram of an example of a terminal device according to an embodiment of this application. As shown in FIG. 5, the terminal device 400 includes:

a communications unit 410, configured to receive, from a network device, information about an uplink power adjustment parameter value; and a processing unit 420, configured to determine the uplink power adjustment parameter value based on the information about the uplink power adjustment parameter value, where the uplink power adjustment parameter value is related to cross-link interference received by the network device; and determine an uplink power value based on the uplink power adjustment parameter value.

In one embodiment, the uplink power adjustment parameter value is corresponding to $P_1$, and $P_1$ makes the following true: a signal-to-interference ratio SIR of the network device determined when a cross-link interference power value is 0 is equal to an SIR of the network device determined when the cross-link interference power value is not 0; or the uplink power adjustment parameter value is corresponding to $P_1$, and $P_1$ makes the following true: a signal to interference plus noise ratio SINR of the network device determined when a cross-link interference power value is 0 is equal to an SINR of the network device determined when the cross-link interference power value is not 0, where $P_1$ represents a variation amount of a receive power value of the network device, and the variation amount is corresponding to the uplink power adjustment parameter value.

In one embodiment, the terminal device 400 further includes a storage unit, configured to store a plurality of candidate uplink power adjustment parameter values; and the processing unit 420 is specifically configured to select one of a plurality of candidate uplink power adjustment parameter values based on the information about the uplink power adjustment parameter value, where the selected candidate uplink power adjustment parameter value is the uplink power adjustment parameter value.

In one embodiment, the plurality of candidate uplink power adjustment parameter values include candidate uplink power adjustment parameter values being 3, 4.8, 7, 9.5, 10, 10.5, 13, or 20.

In one embodiment, within one time period at one frequency band, the network device and a network device adjacent to the network device may have different communications types.

In one embodiment, the uplink power value makes the following formula true: $P=\min\{P_{max}, F(M, P_0, α)+β\}$; $P=\min\{P_{max}, F(M, P_0, α)+10 \log_{10}(1+β)\}$; or $P=\min\{P_{max}x, F(M, P_0, α)+10 \log_{10}β\}$, where P represents the uplink power value of the terminal device 400, min{ } means to calculate a minimum value, $P_{max}$ represents a maximum uplink power value allowed by the terminal device 400, M represents a quantity of resource blocks used when the terminal device 400 sends an uplink signal, $P_0$ represents a target receive power value of the network device when the cross-link interference power value is 0, α represents a path loss compensation parameter, β represents the uplink power adjustment parameter value, and $F(M, P_0, α)$ represents a function related to M, $P_0$, and α.

It should be understood that, the units of the terminal device 400 provided in this embodiment of this application and the foregoing other operations or functions are used to implement the corresponding procedure executed by the terminal device in the uplink power control method provided in the embodiment of this application. For brevity, details are not described herein again.

Figure 6:
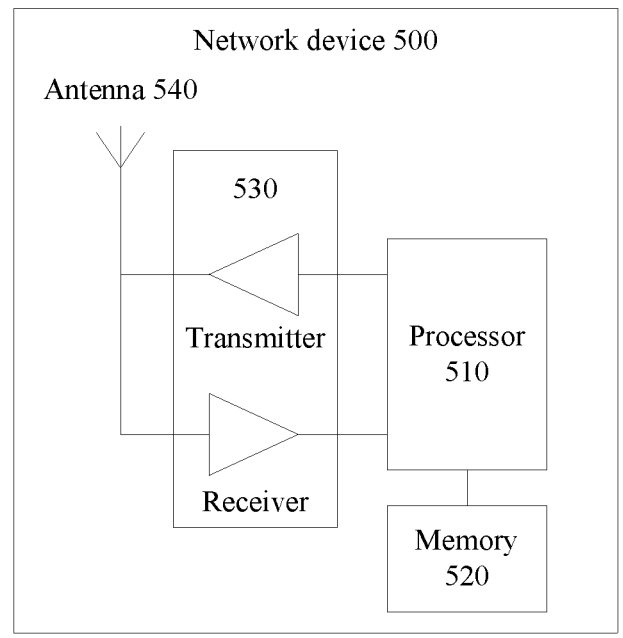
FIG. 6 is a schematic block diagram of another example of a network device according to an embodiment of this application.

FIG. 6 is a schematic block diagram of another example of a network device according to an embodiment of this application. As shown in FIG. 6, the network device 500 includes one or more processors 510, one or more memories 520, one or more transceivers 530 (each transceiver may include a transmitter and/or a receiver). The transmitter or receiver is connected to one or more antennas 540, and transmit or receive a signal through the antenna. The memory 520 stores a computer program instruction (in other words, code). The processor 510 executes the computer program instruction stored in the memory 520, to implement a corresponding procedure and/or an operation executed by the network device in the uplink power control method provided in the embodiment of this application. For brevity, details are not described herein again.

Similarly, the network device 300 shown in FIG. 4 may be implemented by using the network device 500 shown in FIG. 6. For example, the processing unit 310 shown in FIG. 4 may be implemented by using the processor 510, and the communications unit 320 may be implemented, for example, by using the transceiver 530 shown in FIG. 6.

Figure 7:
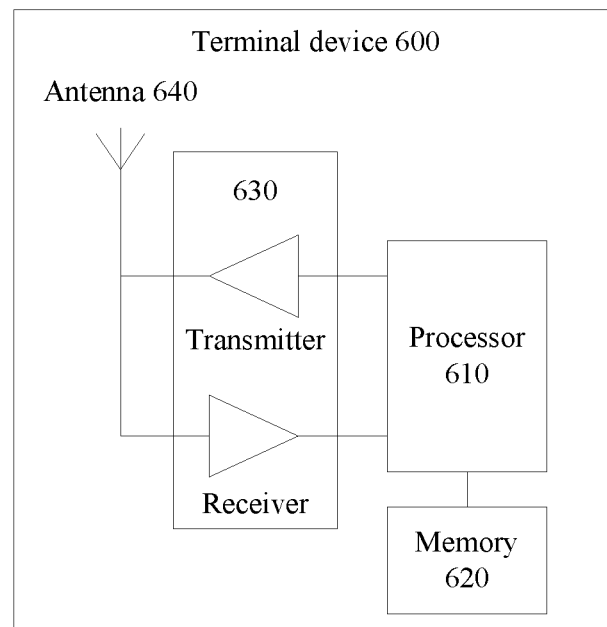
FIG. 7 is a schematic block diagram of another example of a terminal device according to an embodiment of this application.

FIG. 7 is a schematic block diagram of another example of a terminal device according to an embodiment of this application. As shown in FIG. 7, the terminal device 600 includes one or more processors 610, one or more memories 620, one or more transceivers 630 (each transceiver may include a transmitter and/or a receiver). The transmitter or receiver is connected to one or more antennas 640, and transmit or receive a signal through the antenna. The memory 620 stores a computer program instruction (in other words, code). The processor 610 executes the computer program instruction stored in the memory 620, to implement a corresponding procedure and/or an operation executed by the terminal device in the uplink power control method provided in the embodiment of this application. For brevity, details are not described herein again.

Similarly, the terminal device 400 shown in FIG. 5 may be implemented by using the terminal device 600 shown in FIG. 7. For example, the communications unit 410 shown in FIG. 5 may be implemented by using the transceiver 630 shown in FIG. 7, and the processing unit 420 may be implemented by using the processor 610, and the like.

In the foregoing embodiment, the processor may be a central processing unit (Central Processing Unit, CPU), a microprocessor, an application-specific integrated circuit (Application-Specific Integrated Circuit, ASIC), one or more integrated circuits configured to control execution of programs of the solutions of this application, or the like. For example, the processor may include a digital signal processor device, a micro processor device, an analog-to-digital converter, and a digital-to-analog converter. The processor may allocate a control function and a signal processing function of a mobile device to these devices according to respective functions of these devices. In addition, the processor may include a function of operating one or more software programs, and the software program may be stored in the memory.

The memory may be a read-only memory (Read-Only Memory, ROM) or another type of static storage device that can store static information and instructions, or a random access memory (Random Access Memory, RAM) or another type of dynamic storage device that can store information and instructions. Alternatively, the processor may be an electrically erasable programmable read-only memory (Electrically Erasable Programmable Read-Only Memory, EEPROM), a compact disc read-only memory (Compact Disc Read-Only Memory, CD-ROM) or another optical disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in an instruction or signal structure form and that can be accessed by a computer. However, the processor is not limited thereto. The memory may exist alone, or may be integrated into the processor.

The transceiver may include, for example, an infrared transceiver, an RF transceiver, a wireless universal serial bus (Universal Serial Bus, USB) transceiver, a Bluetooth transceiver. Although not shown, the terminal device and the network device may use a corresponding communications technology to send information (or a signal) by using a transmitter, and/or receive information (a signal) by using a receiver.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for ease of convenience and brevity, for a detailed working process of the foregoing system, apparatus, and unit, reference may be made a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electric, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An uplink power control method, wherein the method comprises:
   determining, by a network device, an uplink power adjustment parameter value of a terminal device, wherein the uplink power adjustment parameter value is related to cross-link interference received by the network device;
   selecting, by the network device, a candidate uplink power adjustment parameter value from a plurality of candidate uplink power adjustment parameter values based on the determined uplink power adjustment parameter value, the selected candidate uplink power adjustment parameter value having a minimum difference from the determined uplink power adjustment parameter value;
   sending, by the network device, information about the uplink power adjustment parameter value to the terminal device, wherein the information indicates the candidate uplink power adjustment parameter value selected by the network device.

2. The method according to claim 1, wherein
   the uplink power adjustment parameter value corresponds to $P_1$, and $P_1$ makes the following true: a signal-to-interference ratio (SIR) of the network device determined when a cross-link interference power value is 0 is equal to an SIR of the network device determined when the cross-link interference power value is not 0; or
   the uplink power adjustment parameter value corresponds to $P_1$, and $P_1$ makes the following true: a signal to interference plus noise ratio (SINR) of the network device determined when a cross-link interference power value is 0 is equal to an SINR of the network device determined when the cross-link interference power value is not 0, wherein
   $P_1$ represents a variation amount of a receive power value of the network device, and the variation amount is corresponding to the uplink power adjustment parameter value.

3. The method according to claim 2, wherein that $P_1$ makes the following true: a SIR of the network device determined when a cross-link interference power value is 0 is equal to an SIR of the network device determined when the cross-link interference power value is not 0 comprises that $P_1$ makes the following formula true:

$$P_0/I_0=(P_0+P_1)/(I_0+I_1) \quad ; \text{ or}$$

$$P_0/I_0=(P_0+P_1)/(I_{total})$$

wherein $P_0$ represents a target receive power value of the network device when the cross-link interference power value is 0, $I_0$ represents a codirectional link interference power value of a codirectional link interference received by the network device or a codirectional link interference power value stored in the network device, $I_1$ represents a cross-link interference power value of cross-link interference received by the network device, and $I_{total}$ represents a total interference power value of the cross-link interference and the codirectional link interference received by the network device.

4. The method according to claim 1, wherein the uplink power adjustment parameter value is β, and makes the following formula true:

$$\beta=10 \log_{10}(1+I_1/I_0) \quad ;$$

$$\beta=10 \log_{10}(I_{total}/I_0) \quad ;$$

$$\beta=I_1/I_0 \quad ; \text{ or}$$

$$\beta=I_{total}/I_0$$

wherein $I_0$ represents a codirectional link interference power value of a codirectional link interference received by the network device or a codirectional link interference power value stored in the network device, $I_1$ represents a cross-link interference power value of the cross-link interference received by the network device, and $I_{total}$ represents a total interference power value of the cross-link interference and the codirectional link interference received by the network device.

5. The method according to claim 2, wherein that $P_1$ makes the following true: an SINR of the network device determined when a cross-link interference power value is 0 is equal to an SINR of the network device determined when the cross-link interference power value is not 0 comprises that $P_1$ makes the following formula true:

$$P_0/(I_0+N)=(P_0+P_1)/(I_0+I_1+N); \text{ or}$$

$$P_0/I_0=(P_0+P_1)/(I_{total}+N)$$

wherein $P_0$ represents a target receive power value of the network device when the cross-link interference power value is 0, $I_0$ represents a codirectional link interference power value of a codirectional link interference received by the network device or a codirectional link interference power value stored in the network device, $I_1$ represents a cross-link interference power value of a cross-link interference received by the network device, $I_{total}$ represents a total interference power value of the cross-link interference and the codirectional link interference received by the network device, and N represents a noise power value of the network device.

6. The method according to claim 1, wherein the uplink power adjustment parameter value is β, and makes the following formula true:

$$\beta=10 \log_{10}(1+I_1/(I_0+N)) \quad ;$$

$$\beta=10 \log_{10}((I_{total}+N)/(I_0+N)) \quad ;$$

$$\beta = I_1/(I_0+N)$$ ; or $$\beta = (I_{total}+N)/(I_0+N)$$

wherein $I_0$ represents a codirectional link interference power value of a codirectional link interference received by the network device or a codirectional link interference power value stored in the network device, $I_1$ represents a cross-link interference power value of a cross-link interference received by the network device, $I_{total}$ represents a total interference power value of the cross-link interference and the codirectional link interference received by the network device, and N represents the noise power value.

7. The method according to claim 1, wherein the determining, by a network device, an uplink power adjustment parameter value of a terminal device comprises:
   selecting, by the network device, one of the plurality of candidate uplink power adjustment parameter values as the uplink power adjustment parameter value.

8. An uplink power control method, wherein the method comprises:
   receiving, by a terminal device, information about an uplink power adjustment parameter value from a network device, wherein the terminal device stores a plurality of candidate uplink power adjustment parameter values;
   determining, by the terminal device, the uplink power adjustment parameter value based on the information about the uplink power adjustment parameter value, wherein the uplink power adjustment parameter value determined by the terminal device is related to a cross-link interference received by the network device, wherein the determining, by the terminal device, the uplink power adjustment parameter value based on the information about the uplink power adjustment parameter value comprises selecting, by the terminal device, one of a plurality of candidate uplink power adjustment parameter values based on the information about the uplink power adjustment parameter value, wherein the selected candidate uplink power adjustment parameter value is a power adjustment value having a minimum difference from the uplink power adjustment parameter value; and
   determining, by the terminal device, an uplink power value based on the uplink power adjustment parameter value.

9. The method according to claim 8, wherein the uplink power adjustment parameter value is corresponding to $P_1$, and $P_1$ makes the following true: a signal-to-interference ratio (SIR) of the network device determined when a cross-link interference power value is 0 is equal to an SIR of the network device determined when the cross-link interference power value is not 0; or
   the uplink power adjustment parameter value is corresponding to $P_1$, and $P_1$ makes the following true: a signal to interference plus noise ratio (SINR) of the network device determined when a cross-link interference power value is 0 is equal to an SINR of the network device determined when the cross-link interference power value is not 0, wherein
   $P_1$ represents a variation amount of a receive power value of the network device, and the variation amount is corresponding to the uplink power adjustment parameter value.

10. The method according to claim 8, wherein the plurality of candidate uplink power adjustment parameter val-ues comprise candidate uplink power adjustment parameter values being 3, 4.8, 7, 9.5, 10, 10.5, 13, or 20.

11. The method according to claim 8, wherein
    within one time period at one frequency band, the network device and a network device adjacent to the network device have different communications types.

12. The method according to claim 8, wherein the uplink power value makes the following formula true:

$$P = \min\{P_{max}, F(M, P_0, \alpha) + \beta\}$$ ;

$$P = \min\{P_{max}, F(M, P_0, \alpha) + 10 \log_{10}(1+\beta)\}$$ ; or $$P = \min\{P_{max}, F(M, P_0, \alpha) + 10 \log_{10}\beta\}$$

wherein P represents the uplink power value of the terminal device, min{ } means to calculate a minimum value, $P_{max}$ represents a maximum uplink power value allowed by the terminal device, M represents a quantity of resource blocks used when the terminal device sends an uplink signal, $P_0$ represents a target receive power value of the network device when a cross-link interference power value is 0, $\alpha$ represents a path loss compensation parameter, $\beta$ represents the uplink power adjustment parameter value, and $F(M, P_0, \alpha)$ represents a function related to M, $P_0$, and $\alpha$.

13. A terminal device, wherein the terminal device comprises:
    a communications unit, configured to receive, from a network device, information about an uplink power adjustment parameter value, wherein the terminal device stores a plurality of candidate uplink power adjustment parameter values; and
    a processing unit, configured to determine the uplink power adjustment parameter value based on the information about the uplink power adjustment parameter value, wherein the uplink power adjustment parameter value determined by the terminal device is related to a cross-link interference received by the network device; and determine an uplink power value based on the uplink power adjustment parameter value, wherein the determining, by the terminal device, the uplink power adjustment parameter value based on the information about the uplink power adjustment parameter value comprises selecting, by the terminal device, one of a plurality of candidate uplink power adjustment parameter values based on the information about the uplink power adjustment parameter value, wherein the selected candidate uplink power adjustment parameter value is a power adjustment value having a minimum difference from the uplink power adjustment parameter value.

14. The terminal device according to claim 13, wherein the uplink power adjustment parameter value corresponds to $P_1$, and $P_1$ makes the following true: a signal-to-interference ratio (SIR) of the network device determined when a cross-link interference power value is 0 is equal to an SIR of the network device determined when the cross-link interference power value is not 0; or
    the uplink power adjustment parameter value corresponds to $P_1$, and $P_1$ makes the following true: a signal to interference plus noise ratio (SINR) of the network device determined when a cross-link interference power value is 0 is equal to an SINR of the network device determined when the cross-link interference power value is not 0, wherein $P_1$ represents a variation amount of a receive power value of the network device, and the variation amount is corresponding to the uplink power adjustment parameter value.

15. The terminal device according to claim 13, wherein the plurality of candidate uplink power adjustment parameter values comprise candidate uplink power adjustment parameter values being 3, 4.8, 7, 9.5, 10, 10.5, 13, or 20.

16. The terminal device according to claim 13, wherein within one time period at one frequency band, the network device and a network device adjacent to the network device have different communications types.

17. The terminal device according to claim 13, wherein the uplink power value makes the following formula true:

$$P = \min\{P_{max}, F(M, P_0, \alpha) + \beta\};$$

$$P = \min\{P_{max}, F(M, P_0, \alpha) + 10\log_{10}(1+\beta)\}; \text{ or}$$

$$P = \min\{P_{max}, F(M, P_0, \alpha) + 10\log_{10}\beta\}$$

wherein P represents the uplink power value of the terminal device, min{ } means to calculate a minimum value, $P_{max}$ represents a maximum uplink power value allowed by the terminal device, M represents a quantity of resource blocks used when the terminal device sends an uplink signal, $P_0$ represents a target receive power value of the network device when a cross-link interference power value is 0, $\alpha$ represents a path loss compensation parameter, $\beta$ represents the uplink power adjustment parameter value, and $F(M, P_0, \alpha)$ represents a function related to M, $P_0$, and $\alpha$.

* * * * *